(12) United States Patent
Tang

(10) Patent No.: US 12,520,312 B2
(45) Date of Patent: Jan. 6, 2026

(54) METHOD FOR DATA TRANSMISSION, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/932,126

(22) Filed: Sep. 14, 2022

(65) Prior Publication Data

US 2023/0007676 A1    Jan. 5, 2023

Related U.S. Application Data

(63) Continuation of application No. 16/620,951, filed as application No. PCT/CN2017/094174 on Jul. 24, 2017, now Pat. No. 11,483,851.

(51) Int. Cl.
*H04W 72/1273* (2023.01)
*H04L 5/00* (2006.01)
(Continued)

(52) U.S. Cl.
CPC ....... *H04W 72/1273* (2013.01); *H04L 5/0053* (2013.01); *H04L 5/0096* (2013.01);
(Continued)

(58) Field of Classification Search
CPC ......... H04W 72/1273; H04W 72/0453; H04W 72/1263; H04W 72/20; H04W 72/23;
(Continued)

(56) References Cited

U.S. PATENT DOCUMENTS

2012/0320840 A1    12/2012   Kim et al.
2013/0058294 A1    3/2013    Miki et al.
(Continued)

FOREIGN PATENT DOCUMENTS

CN          106464455          2/2017
CN          106559890          4/2017
(Continued)

OTHER PUBLICATIONS

U.S. Appl. No. 62/493,434. Dec. 27, 2016 [online] [retrieved on Apr. 9, 2024]. Retrieved from: PE2E Search. (Year: 2017).*
(Continued)

*Primary Examiner* — Omar J Ghowrwal
(74) *Attorney, Agent, or Firm* — Hodgson Russ LLP

(57) ABSTRACT

Disclosed are a method, and terminal and network devices. The method includes a terminal device receiving first control information for scheduling a terminal device to perform data transmission; and the terminal device according to the transmission information of the terminal device and the first mapping relationship, determining at least one transmission frequency band corresponding to the transmission information. The first mapping relationship includes a correspondence between a plurality of pieces of transmission information and a plurality of transmission frequency bands. The transmission information includes at least one of: an attribute of the first control information, resource type information for the data transmission, and traffic information of the terminal device; the terminal device determining a target transmission frequency band from the at least one transmission frequency band. The terminal device performs data transmission with the network device on the target transmission frequency band according to the first control information.

12 Claims, 5 Drawing Sheets

(51) Int. Cl.
*H04W 16/10* (2009.01)
*H04W 72/02* (2009.01)
*H04W 72/0446* (2023.01)
*H04W 72/0453* (2023.01)
*H04W 72/1263* (2023.01)
*H04W 72/20* (2023.01)
*H04W 72/23* (2023.01)
*H04W 76/27* (2018.01)
*H04W 80/02* (2009.01)
*H04W 80/06* (2009.01)

(52) U.S. Cl.
CPC ........... *H04W 16/10* (2013.01); *H04W 72/02* (2013.01); *H04W 72/0446* (2013.01); *H04W 72/0453* (2013.01); *H04W 72/1263* (2013.01); *H04W 72/20* (2023.01); *H04W 72/23* (2023.01); *H04W 76/27* (2018.02); *H04W 80/02* (2013.01); *H04W 80/06* (2013.01)

(58) Field of Classification Search
CPC ..... H04W 76/27; H04W 80/02; H04W 72/02; H04W 72/0446; H04W 80/06; H04L 5/0053; H04L 5/0096
See application file for complete search history.

(56) References Cited

U.S. PATENT DOCUMENTS

| | | | | |
|---|---|---|---|---|
| 2017/0094688 | A1* | 3/2017 | Lee | H04W 4/70 |
| 2017/0367046 | A1* | 12/2017 | Papasakellariou | H04W 72/23 |
| 2018/0183551 | A1* | 6/2018 | Chou | H04W 74/006 |
| 2019/0260548 | A1* | 8/2019 | Parkvall | H04L 5/0053 |
| 2021/0211343 | A1* | 7/2021 | Baldemair | H04W 72/1263 |

FOREIGN PATENT DOCUMENTS

| | | | | |
|---|---|---|---|---|
| CN | 106851744 | | 6/2017 | |
| CN | 111107649 | | 2/2021 | |
| EP | 3606203 | A1 | 6/2022 | |
| WO | WO-2011047353 | A1 * | 4/2011 | ........... H04L 5/0037 |
| WO | 2013044878 | | 4/2013 | |

OTHER PUBLICATIONS

3rd Generation Partnership Project; Technical Specification Group Radio Access Network; NR; Multiplexing and channel coding [online], May 23, 2017, 3GPP TS 38.212 V0.0.0 [retreived on May 21, 2024]. Retreived from: 3GPP.org (Year: 2017).*
IPA, Office Action for AU Application No. 2017425503, Oct. 26, 2022.
NOIP, Office Action for VN Application No. 1-2019-07095, Jun. 30, 2023.
KIPO, Office Action for KR Application No. 10-2022-7012790, May 11, 2023.
IMPI, Office Action for MX Application No. MX/a/2020/000458, Jun. 20, 2023.
JPO, Office Action for JP Application No. 2022-026874, Jun. 2, 2023.
ILPO, Office Action for IL Application No. 271271, Jun. 11, 2023.
Mediatek Inc., "Further Details on Wider Bandwidth Operations in NR," 3GPP TSG RAN WG1 NR Ad-Hoc#2, R1-17010796, Jun. 2017.
Huawei et al., "Scheduling and resource allocation mechanism for active bandwidth parts," 3GPP TSG RAN WG1 NR Ad Hoc Meeting, R1-1709974, Jun. 2017.
Ericsson, "Summary of e-mail discussions on downlink control signaling," TSG-RAN WG1 #87, R1-1612908, Nov. 2016.
MYIPO, Office Action for MY Application No. PI2019007448, Mar. 18, 2024.
EPO, Communication for EP Application No. 22172588.0, Apr. 24, 2024.
EPO, Communication for EP Application No. 22172588.0, Jun. 5, 2024.
CNIPA, First Office Action for CN Application No. 201780088671. X, May 28, 2024.
EPO, Extended European Search Report for EP Appl. No. 24193686. 3, Nov. 13, 2024.
Nokia et al., "On wider band aspects of NR," 3GPP TSG-RAN WG1 Meeting NR#2, R1-1710883, Jun. 2017.
Jpo, Office Action for JP Application No. 2023-208481, Feb. 18, 2025.
IPOPHL, Office Action for PH Application No. 1/2019/502843, Aug. 20, 2025.
CNIPA, Notice of Acceptance of Invalidation Request for CN Application No. 201911328684.7, Sep. 3, 2025.
Ericsson et al., "Inclusion of CIF in PDCCH for cross-carrier scheduling," 3GPP TSG RAN WG1 Meeting #59bis, R1-100043, Jan. 2010.

* cited by examiner

METHOD FOR DATA TRANSMISSION, TERMINAL DEVICE AND NETWORK DEVICE

CROSS-REFERENCE TO RELATED APPLICATIONS

This application is a continuation of U.S. application Ser. No. 16/620,951, filed Dec. 10, 2019, which is a U.S. is a National Stage Entry of International Application No. PCT/CN2017/094174, filed Jul. 24, 2017, the entire disclosures of which are incorporated herein by reference.

TECHNICAL FIELD

The embodiments of the present application relate to the field of wireless communication, and, more particularly, to a method for data transmission, a terminal device, and a network device.

BACKGROUND

In a Long Term Evolution (LTE) system, frequency domain resources for data transmission are allocated throughout the system bandwidth. In a 5G New Radio (NR) system, since the system bandwidth has been greatly improved, the transmission frequency bandwidth of the terminal device may only occupy a part of the system bandwidth. For example, the network divides the system bandwidth into a plurality of frequency bands, or bandwidth parts (BWP), and indicates to the terminal device the BWP for data transmission through control signaling.

SUMMARY

Embodiments of the present application provides a method for data transmission, a terminal device, and a network device.

In a first aspect, a method for data transmission is provided, including: receiving, by a terminal device, first control information sent by a network device, wherein the first control information is used to schedule the terminal device to perform data transmission; determining, by the terminal device, at least one transmission frequency band corresponding to transmission information according to the transmission information of the terminal device and a first mapping relationship, wherein the first mapping relationship includes a correspondence between a plurality of pieces of transmission information and a plurality of transmission frequency bands, and the transmission information includes at least one of: an attribute of the first control information, resource type information for the data transmission, and traffic information of the terminal device; determining, by the terminal device, a target transmission frequency band from the at least one transmission frequency band; and performing, by the terminal device, the data transmission with the network device on the target transmission frequency band according to the first control information.

In one possible implementation, the first control information includes frequency band information of the target transmission frequency band, and the first mapping relationship further includes a correspondence between a plurality of transmission frequency bands and a plurality of pieces of frequency band information, and determining, by the terminal device, a target transmission frequency band from the at least one transmission frequency band includes: according to the frequency band information of the target transmission frequency band, and the first mapping relationship, determining, by the terminal device, the target transmission frequency band to be a transmission frequency band corresponding to the frequency band information from the at least one transmission frequency band.

In one possible implementation, before the terminal device determines at least one transmission frequency band corresponding to transmission information according to the transmission information of the terminal device and a first mapping relationship, the method further includes: receiving, by the terminal device, second control information sent by the network device, the second control information including the first mapping relationship.

In one possible implementation, the first control information includes downlink control information DCI or a medium access control element MAC CE.

In one possible implementation, the second control information includes a radio resource control RRC signaling or system information.

In one possible implementation, the first control information is DCI, and the attribute of the first control information include any one of: a DCI format of the DCI, a size of the DCI, and information indicating whether the DCI schedules uplink data or downlink data.

In one possible implementation, the resource type information includes any one of: information indicating that the first control information schedules a common resource or a dedicated resource for the terminal device, information indicating that the first control information schedules a continuous resource or discontinuous resources, or information indicating a resource scheduling unit, wherein the scheduling unit includes a symbol, a time slot or a subframe.

In one possible implementation, the traffic information of the terminal device includes at least one of: traffic type information of the terminal device, service quality information of the terminal device, and traffic quality information of the terminal device.

In one possible implementation, the plurality of pieces of transmission information includes first transmission information and second transmission information, and at least one transmission frequency band corresponding to the first transmission information and at least one transmission frequency band corresponding to the second transmission frequency band are the same or at least partially different.

In a second aspect, a method for data transmission is provided, including: determining, by a network device, according to transmission information of a terminal device and a first mapping relationship, at least one transmission frequency band corresponding to the transmission information, wherein the first mapping relationship includes a correspondence between a plurality of pieces of transmission information and a plurality of transmission frequency bands, and the transmission information includes at least one of: an attribute of the first control information, resource type information for the data transmission, and traffic information of the terminal device; determining, by the network device, a target transmission frequency band from the at least one transmission frequency band; sending, by the network device, first control information to the terminal device; and performing, by the network device, the data transmission with the terminal device on the target transmission frequency band.

In one possible implementation, the first control information includes frequency band information of the target transmission frequency band, and the first mapping relationship further includes a correspondence between a plurality of transmission frequency bands and a plurality of pieces of frequency band information, and before the network device sends the first control information to the terminal device, the method further includes: determining, by the network device, frequency band information corresponding to the target transmission frequency band from at least one piece of frequency band information corresponding to the at least one transmission frequency band according to the target transmission frequency band and the first mapping relationship.

In one possible implementation, before the network device performs the data transmission with the terminal device on the target transmission frequency band, the method further includes: sending, by the network device, second control information to the terminal device, wherein the second control information includes the first mapping relationship.

In one possible implementation, the first control information includes downlink control information DCI or a medium access control element MAC CE.

In one possible implementation, the second control information includes a radio resource control RRC signaling or system information.

In one possible implementation, the first control information is DCI, and the attribute of the first control information include any one of: a DCI format of the DCI, a size of the DCI, and information indicating whether the DCI schedules uplink data or downlink data.

In one possible implementation, the resource type information includes any one of: information indicating that the first control information schedules a common resource or a dedicated resource for the terminal device, information indicating that the first control information schedules a continuous resource or discontinuous resources, or information indicating a resource scheduling unit, wherein the scheduling unit includes a symbol, a time slot or a subframe.

In one possible implementation, the traffic information of the terminal device includes at least one of: traffic type information of the terminal device, service quality information of the terminal device, and traffic quality information of the terminal device.

In one possible implementation, the plurality of pieces of transmission information includes first transmission information and second transmission information, and at least one transmission frequency band corresponding to the first transmission information and at least one transmission frequency band corresponding to the second transmission frequency band are the same or at least partially different.

In a third aspect, a terminal device is provided. The terminal device can perform the operation of the terminal device in the above first aspect or any optional implementation of the first aspect. In particular, the terminal device can include a modular unit for performing the operations of the terminal device in any of the first aspect or the possible implementations of the first aspect described above.

In a fourth aspect, a network device is provided. The network device can perform the operation of the network device in the above second aspect or any optional implementation of the second aspect. In particular, the network device can include a modular unit for performing the operations of the network device in any of the second aspect or the possible implementations of the second aspect described above.

In a fifth aspect, a terminal device is provided, including a processor, a transceiver, and a memory. The processor, the transceiver, and the memory communicate with one another via internal connection paths. The memory is for storing instructions and the processor is for executing instructions stored in the memory. When the processor executes the instructions stored by the memory, the execution causes the terminal device to perform the method in the first aspect or any possible implementation of the first aspect, or the execution causes the terminal device to implement the terminal device provided in the third aspect.

In a sixth aspect, a network device is provided, including a processor, a transceiver, and a memory. The processor, the transceiver, and the memory communicate with one another via internal connection paths. The memory is for storing instructions and the processor is for executing instructions stored in the memory. When the processor executes the instructions stored by the memory, the execution causes the network device to perform the method in the second aspect or any possible implementation of the second aspect, or the execution causes the network device to implement the network device provided in the fourth aspect.

In a seventh aspect, a computer readable storage medium is provided, the computer readable storage medium storing a program causing a terminal device to perform the first aspect described above, and any method for data transmission in various implementations.

In an eighth aspect, a computer readable storage medium is provided, the computer readable storage medium storing a program causing a network device to perform the second aspect described above, and any method for data transmission in various implementations.

In a ninth aspect, a system chip is provided, the system chip including an input interface, an output interface, a processor, and a memory. The processor is configured to execute instructions stored in the memory, and when the instructions are executed, the processor can implement the above method of any of the first aspect or the possible implementations of the first aspect.

In a tenth aspect, a system chip is provided, the system chip including an input interface, an output interface, a processor, and a memory. The processor is configured to execute instructions stored in the memory, and when the instructions are executed, the processor can implement the above method of any of the second aspect or the possible implementations of the second aspect.

In an eleventh aspect, a computer program product including instructions is provided, when the computer program product is run on a computer, the computer is caused to execute the above method of any of the first aspect or the possible implementations of the first aspect.

In a twelfth aspect, a computer program product including instructions is provided, when the computer program product is run on a computer, the computer is caused to execute the above method of any of the second aspect or the possible implementations of the second aspect.

DETAILED DESCRIPTION

The technical solutions in the embodiments of the present application will be described below with reference to the accompanying drawings.

It should be understood that the technical solution of the embodiment of the present application can be applied to various communication systems, for example, Global System of Mobile communication (GSM) systems, Code Division Multiple Access (CDMA) systems, Wideband Code Division Multiple Access (WCDMA) systems, Long Term Evolution (LTE) systems, LTE Frequency Division Duplex (FDD) systems, LTE Time Division Duplex (TDD) systems, Universal Mobile Telecommunication Systems (UMTS), 5G telecommunication systems or the like.

The present application describes various embodiments in connection with a terminal device. The terminal device can also refer to a user equipment (UE), an access terminal, a subscriber unit, a subscriber station, a mobile station, a mobile platform, a remote station, a remote terminal, a mobile device, a user terminal, a terminal, a wireless communication device, and a user agent or a user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in a 5G network, a terminal device in a public land mobile network (PLMN) or the like.

The present application describes various embodiments in connection with a network device. The network device can be a device for communicating with a terminal device. For example, the network device can be a base station (Base Transceiver Station, BTS) in a GSM or CDMA system, or can be a base station (NodeB, NB) in a WCDMA system, or can be an evolved base station (Evolutional Node B, eNB or eNodeB) in an LTE system, or the network device can be a relay station, an access point, an in-vehicle device, a wearable device, and a network side device in a 5G network, a network side device in a PLMN network or the like.

Figure 1:
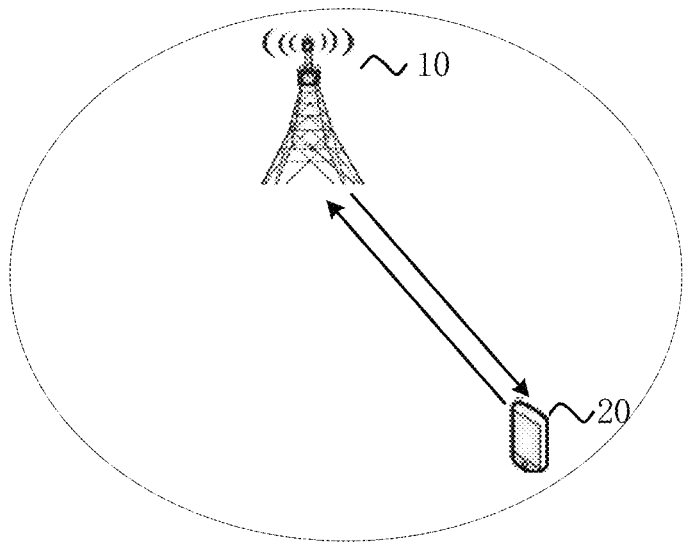
FIG. 1 is a schematic structural diagram of an application scenario of an embodiment of the present application.

FIG. 1 is a schematic diagram of an application scenario of an embodiment of the present application. The communication system in FIG. 1 can include a network device 10 and a terminal device 20. The network device 10 is configured to provide communication services and provide access to the core network for the terminal device 20. The terminal device 20 can access the network by searching for synchronization signals, broadcast signals, and the like transmitted by the network device 10, thereby performing communication over the network. The arrows shown in FIG. 1 can represent uplink/downlink transmissions by a cellular link between the terminal device 20 and the network device 10.

The network in the embodiments of the present application can refer to a Public Land Mobile Network (PLMN) or a Device to Device (D2D) network or a Machine to Machine/Man (M2M) network or other networks. FIG. 1 is only a simplified schematic diagram of an example, and other terminal devices can also be included in the network, which are not shown in FIG. 1.

Figure 2:
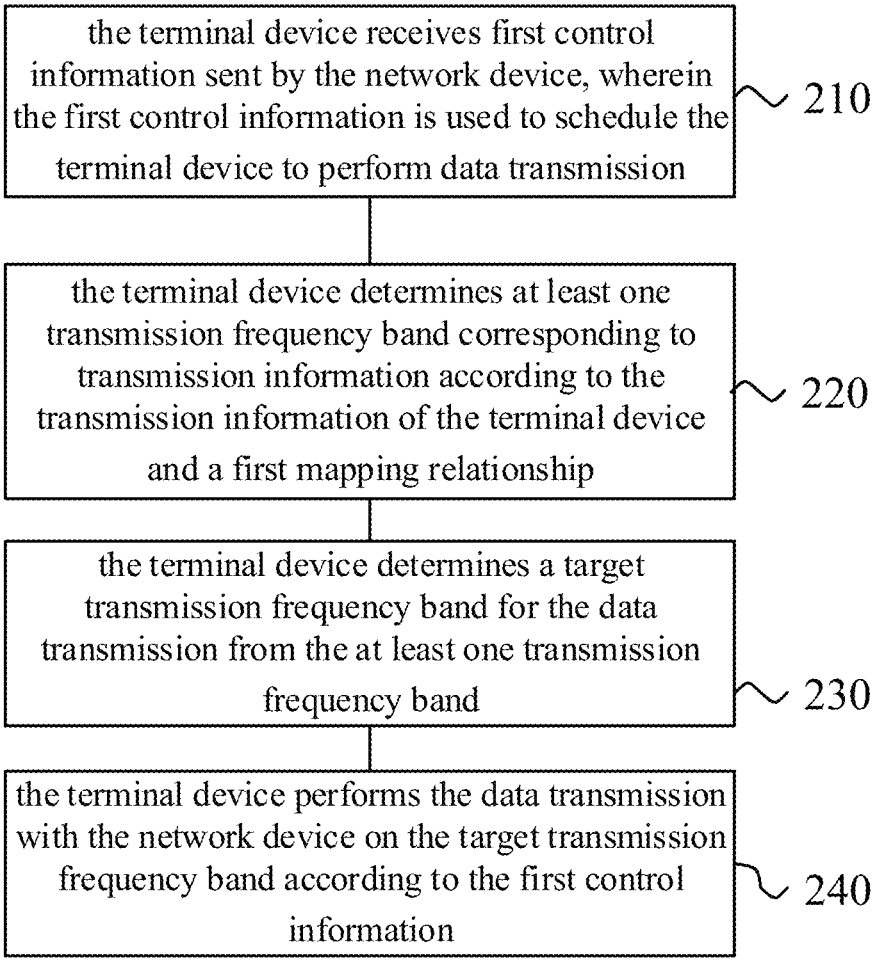
FIG. 2 is a schematic flowchart of a method for data transmission according to an embodiment of the present application.

FIG. 2 is a schematic flowchart of a method for data transmission according to an embodiment of the present application. The method shown in FIG. 2 can be performed by a terminal device, which can be, for example, the terminal device 20 shown in FIG. 1. As shown in FIG. 2, the method for data transmission includes the following steps.

In 210, the terminal device receives first control information sent by the network device.

The first control information is used to schedule the terminal device to perform data transmission.

Optionally, the first control information includes Down Control Information (DCI) or Media Access Control (MAC) Control Element (CE).

In 220, the terminal device determines at least one transmission frequency band corresponding to transmission information according to the transmission information of the terminal device and a first mapping relationship.

The first mapping relationship includes a correspondence between a plurality of pieces of transmission information and a plurality of transmission frequency bands.

Different transmission frequency bands can have different bandwidth sizes and/or occupy different frequency domain locations, and the basic parameter sets for data transmission in different frequency bands, such as subcarrier intervals, can also be different. The transmission frequency band can also be referred to as a bandwidth configuration or a Band Width Part (BWP) configuration. The system bandwidth can include a plurality of transmission frequency bands, that is, a plurality of BWPs, and each BWP can have a corresponding BWP serial number for identifying a respective BWP.

The transmission information includes at least one of the following: an attribute of the first control information, resource type information for the data transmission, and traffic information of the terminal device.

Optionally, the transmission information can be an attribute of the first control information. For example, when the first control information is DCI, the transmission information can be a DCI format of the DCI, a DCI size of the DCI, or information indicating whether the DCI schedules uplink data or downlink data.

Optionally, the transmission information can also be resource type information used for the data transmission, for example, information indicating that the first control information schedules a common resource or a dedicated resource for the terminal device, information indicating that the first control information schedules a continuous resource or discontinuous resources, or information indicating a resource scheduling unit.

That is to say, the resource scheduled by the first control information can be divided according to whether it is a public resource or a dedicated resource, or divided according to its continuity, or divided according to the granularity of the scheduled resources, and depending on the division result, the respective transmission frequency bands of different types of resources can be determined.

The public resource (UE-group-common) is a transmission resource commonly used by a plurality of terminal devices, including the terminal device, and the dedicated resource (UE-specific) is a transmission resource exclusively occupied by the terminal device. The network device can send a UE-specific resource indication or a UE-group-common resource indication to the terminal device.

The scheduling unit of the data resource can be a time slot, a subframe, a symbol, or the like. For example, when the resource scheduling is in units of time slots, the network device can indicate to the terminal device a location of the time slot in which the transmission resource for the data transmission is located, and the terminal device will transmit data on a fixed time domain symbol of the time slot, which process can also be referred to as a slot-based scheduling. When the resource scheduling is in units of symbols, the network device not only indicates to the terminal device a location of the time slot in which the transmission resource for the data transmission is located, but also indicates to the terminal device which of the symbols the transmission resource is in the time slot, which process can also be referred to as a symbol-based scheduling or non-slot-based scheduling.

Optionally, the transmission information can also be traffic information of the terminal device, such as traffic type information of the terminal device, service quality information of the terminal device, or traffic quality information of the terminal device.

Optionally, before step 220, that is, before the terminal device determines at least one transmission frequency band corresponding to transmission information according to the transmission information of the terminal device and a first mapping relationship, the method further includes: the terminal device receiving second control information sent by the network device, the second control information including the first mapping relationship.

Specifically, the first mapping relationship between a plurality of pieces of transmission information and a plurality of transmission frequency bands can be, for example, a protocol specification pre-agreed between the terminal device and the network device, or can be determined by the network device and then configured to the terminal device. The network device can adjust the first mapping relationship at any time and send the second control information to the terminal device to indicate the mapping relationship. The terminal device determines at least one transmission frequency band corresponding to the transmission information based on the first mapping relationship configured by the network device.

It should be understood that the first mapping relationship between a plurality of pieces of transmission information and a plurality of transmission frequency bands can be presented, for example, in a form of a table, a formula, an image, or the like, and in the correspondence between a plurality of pieces of transmission information and a plurality of transmission frequency bands, one piece of transmission information can correspond to one or more transmission frequency bands, and one transmission frequency band can also correspond to one or more pieces of transmission information. That is, the terminal device can determine the transmission frequency band corresponding to the transmission information by searching a preset mapping table including a correspondence between a plurality of pieces of transmission information and a plurality of transmission frequency bands; or the terminal device can also calculate the identifier or serial number of the transmission frequency band corresponding to the transmission information through a preset formula and related parameter information of the transmission information. This application does not limit this.

In 230, the terminal device determines a target transmission frequency band for the data transmission from the at least one transmission frequency band.

Specifically, the terminal device selects one or more transmission frequency bands as the target transmission frequency band for the data transmission from the at least one transmission frequency band corresponding to the transmission information thereof. For example, the terminal device can randomly select one transmission frequency band as the target transmission frequency band for the data transmission from the at least one transmission frequency band, or can perform the data transmission using all the transmission frequency bands in the at least one transmission frequency band, or select a corresponding one as the target transmission frequency band from the at least one transmission ban based on a preset rule.

In particular, if one transmission information corresponds to only one transmission frequency band, that is, only one transmission frequency band is included in the at least one transmission frequency band corresponding to the transmission information, then in 230, the terminal device determining a target transmission frequency band for the data transmission from the at least one transmission frequency band includes: the terminal device determining the transmission frequency band corresponding to the transmission information as the target transmission frequency band.

Optionally, the first control information includes frequency band information of the target transmission frequency band, and the first mapping relationship further includes a correspondence between a plurality of transmission frequency bands and a plurality of pieces of frequency band information. Then, in 230, the terminal device determining a target transmission frequency band for the data transmission from the at least one transmission frequency band includes: according to the frequency band information of the target transmission frequency band, and the first mapping relationship, the terminal device determining the target transmission frequency band to be a transmission frequency band corresponding to the frequency band information from the at least one transmission frequency band.

Specifically, the first mapping relationship further includes a correspondence between a plurality of transmission frequency bands and a plurality of pieces of frequency band information, and after the terminal device determines the at least one transmission frequency band corresponding to the transmission information, according to the frequency band information carried in the first control information, and the first mapping relationship, the terminal device determines the target transmission frequency band to be a transmission frequency band corresponding to the frequency band information from the at least one transmission frequency band.

It should be noted that each transmission frequency band has its own corresponding frequency band information, and the frequency band information corresponding to each transmission frequency band is not unique. If at least one transmission frequency band corresponding to transmission information 1 includes the same transmission frequency band in at least one transmission frequency band corresponding to transmission information 2, the same transmission frequency band can have different frequency band information or have the same frequency band information when corresponding to different transmission information. For example, the transmission information corresponding to the same transmission frequency band in the at least one transmission frequency band corresponding to the transmission information 1 is 00, and the transmission information corresponding to the same transmission frequency band in the at least one transmission frequency band corresponding to the transmission information 2 is 01.

In 240, the terminal device performs the data transmission with the network device on the target transmission frequency band according to the first control information.

Specifically, after the terminal device determines at least one transmission frequency band corresponding to the transmission information according to the transmission information, the terminal device determines a target transmission frequency band for the data transmission from the at least one transmission frequency band according to the frequency band information in the first control information. Thereby, the terminal device perform the data transmission data on the scheduled resource in the target transmission frequency band with the network device according to the scheduling of the first control information sent by the network device.

It should be understood that, in the embodiment of the present application, when the terminal device performs data transmission with the network device on the transmission frequency band, the data transmitted can include traffic data, signaling data, or other types of data. The data transmission includes the terminal device receiving the data sent by the network device or the terminal device transmitting the data to the network device.

Accordingly, based on the method of the embodiment of the present application, the terminal device can determine at least one transmission frequency band corresponding to the transmission information according to the transmission information thereof, and determine a transmission frequency band for performing data transmission from the at least one transmission frequency band. Since the network device only has to indicate with respect to at least one transmission frequency band corresponding to each transmission frequency band without indicating with respect to all transmission frequency bands in the system bandwidth, it can reduce signaling overhead on downlink control information.

For example, as shown in Table I, it is assumed that the system bandwidth includes 8 BWPs, the first control information is DCI, the transmission information is DCI Format, and the first control information includes preset bits for indicating frequency band information of the transmission frequency band.

TABLE I

| DCI Format | BWP Serial Number | Frequency Band Information |
| --- | --- | --- |
| DCI Format 1 | BWP 1 | 00 |
|  | BWP 2 | 01 |
|  | BWP 3 | 10 |
|  | BWP 4 | 11 |
| DCI Format 2 | BWP 5 | 0 |
|  | BWP 6 | 1 |
| DCI Format 3 | BWP 7 | Null |
| DCI Format 4 | BWP 8 | Null |

According to the mapping relationship shown in Table I, if the format of the DCI received by the terminal device is DCI Format 1, the terminal device can determine that at least one BWP corresponding to DCI Format 1 includes BWP 1 to BWP 4. If the frequency band information carried in the DCI received by the terminal device is 00, the terminal device can determine that the target transmission frequency band for the data transmission is BWP 1. If the frequency band information in the DCI is 01, the terminal device can determine the target transmission frequency band is BWP 2. If the frequency band information in the DCI is 10, the terminal device can determine that the target transmission frequency band is BWP 3. If the frequency band information in the DCI is 11, the terminal device can determine that the target transmission frequency band is BWP 4.

If the format of the DCI received by the terminal device is DCI Format 2, the terminal device can determine that at least one BWP corresponding to the DCI Format 2 includes BWP 5 and BWP 6. If the frequency band information in the DCI is 0, the terminal device can determine that the target transmission frequency band is BWP 5. If the frequency band information in the DCI is 1, the terminal device can determine that the target transmission frequency band is BWP 6.

If the format of the DCI received by the terminal device is DCI Format 3, the terminal device can determine that the at least one transmission band corresponding to DCI Format 3 only includes BWP 7, and can determine BWP 7 to be the target transmission frequency band.

If the format of the DCI received by the terminal device is DCI Format 4, the terminal device can determine that the at least one transmission band corresponding to DCI Format 4 only includes BWP8, and can determine BWP 8 to be the target transmission frequency band.

It can be seen that if the DCI is directly used to indicate the eight transmission frequency bands of BWP 1 to BWP 8, respectively, at least 3 bits should be included in the DCI to indicate the respective transmission frequency bands. According to the mapping relationship shown in Table I, only two bits are required to indicate the eight transmission frequency bands of BWP 1 to BWP 8, which can reduce the signaling overhead of DCI. For example, if the format of the DCI received by the terminal device is DCI Format 2, the frequency band information carried in the DCI can occupy only 1 bit, for example, 0 is used to indicate BWP 5, 1 is used to indicate BWP 6; and if the format of the DCI received by the terminal device is DCI Format 3 or DCI Format 4, the DCI may not carry any extra bit for indicating BWP, thereby saving DCI overhead.

It should be understood that, for at least one transmission frequency band corresponding to different transmission information, the frequency band information carried in the first control information can also occupy the same number of bits. For example, as shown in Table II, the first control information is DCI, and the DCI includes two bits for indicating at least one BWP corresponding to each DCI format. If the format of the DCI received by the terminal device is DCI Format 1, the frequency band information 00 in the DCI is used to indicate BWP 1, the frequency band information 01 in the DCI is used to indicate BWP 2, the frequency band information 10 is used to indicate BWP 3, and the frequency band information 11 in the DCI is used to indicate BWP 4; if the format of the DCI received by the terminal device is DCI Format 2, the frequency band information 00 in the DCI is used to indicate BWP 5, and the frequency band information 01 in the DCI is used to indicate BWP 6 (where 10 and 11 are also used to indicate other information); if the format of the DCI received by the terminal device is DCI Format 3, the frequency band information 00 is used to indicate BWP 7 (where 01, 10 and 11 can also be used to indicate other information); and if the format of DCI received by the terminal device is DCI Format 4, and the frequency band information 00 is used to indicate BWP 8 (where 01, 10, and 11 can also be used to indicate other information).

TABLE II

| DCI Format | BWP Serial Number | Frequency Band Information |
| --- | --- | --- |
| DCI Format 1 | BWP 1 | 00 |
|  | BWP 2 | 01 |
|  | BWP 3 | 10 |
|  | BWP 4 | 11 |

TABLE II-continued

| DCI Format | BWP Serial Number | Frequency Band Information |
|---|---|---|
| DCI Format 2 | BWP 5 | 00 |
|  | BWP 6 | 01 |
| DCI Format 3 | BWP 7 | 00 |
| DCI Format 4 | BWP 8 | 00 |

It should be further understood that, in the embodiment of the present application, the plurality of pieces of transmission information includes first transmission information and second transmission information, and at least one transmission frequency band corresponding to the first transmission information and at least one transmission frequency band corresponding to the second transmission information can be the same or at least partially different.

In other words, at least one transmission frequency band corresponding to each piece of transmission information can be referred to as a frequency band set, and different frequency band sets corresponding to respective transmission information can have the same transmission frequency band or different transmission frequency bands, but the same transmission frequency band in the frequency band sets corresponding to the different transmission information can have different corresponding frequency band information. However, for a certain piece of transmission information, the transmission frequency bands in the frequency band set corresponding to the transmission information are different from one another.

For example, in the case shown in Table III, at least one BWP corresponding to DCI Format 1 includes BWP 1 to BWP 4, at least one BWP corresponding to DCI Format 2 includes BWP 2, BWP 5, and BWP 6, at least one BWP corresponding to DCI Format 3 includes BWP 3 and BWP 7, and at least one BWP corresponding to DCI Format 4 only includes BWP 8.

It can be seen that the BWPs corresponding to DCI Format 1 and DCI Format 2 both include BWP 2, but in at least one BWP corresponding to DCI Format 1, the frequency band information of BWP 2 is 01, and in at least one BWP corresponding to DCI Format 2, the frequency band information of BWP 2 is 00.

Moreover, the BWPs corresponding to DCI Format 1 and DCI Format 3 can both include BWP 3, but in at least one BWP corresponding to DCI Format 1, the frequency band information of BWP 3 is 10, and in at least one BWP corresponding to DCI Format 3, the frequency band information of BWP 3 is 00.

TABLE III

| DCI Format | BWP Serial Number | Frequency Band Information |
|---|---|---|
| DCI Format 1 | BWP 1 | 00 |
|  | BWP 2 | 01 |
|  | BWP 3 | 10 |
|  | BWP 4 | 11 |
| DCI Format 2 | BWP 2 | 00 |
|  | BWP 5 | 01 |
|  | BWP 6 | 10 |
| DCI Format 3 | BWP 3 | 00 |
|  | BWP 7 | 01 |
| DCI Format 4 | BWP 8 | 00 |

For the first mapping relationship shown in Table III, there can be another form. As shown in Table IV, BWP 1 corresponds to DCI Format 1, BWP 2 can correspond to DCI Format 1 and DCI Format 2, BWP 3 can correspond to DCI Format 1 and DCI Format 3, BWP 4 corresponds to DCI Format 2, BWP 5 corresponds to DCI Format 2, BWP 6 corresponds to DCI Format 2, BWP 7 corresponds to DCI Format 3, and BWP 8 corresponds to DCI Format 4.

If a BWP corresponds to a plurality of DCI formats, the BWP corresponding to the different DCI formats has different frequency band information. For example, when in DCI Format 1, BWP 2 has corresponding band information of 01, and when in DCI Format 2, the corresponding band information is 00.

TABLE IV

| BWP Serial Number | DCI Format | Frequency Band Information |
|---|---|---|
| BWP 1 | DCI Format 1 | 00 |
| BWP 2 | DCI Format 1 | 01 |
|  | DCI Format 2 | 00 |
| BWP 3 | DCI Format 1 | 10 |
|  | DCI Format 3 | 00 |
| BWP 4 | DCI Format 1 | 11 |
| BWP 5 | DCI Format 2 | 01 |
| BWP 6 | DCI Format 2 | 10 |
| BWP 7 | DCI Format 3 | 01 |
| BWP 8 | DCI Format 4 | 00 |

In the forgoing, the first mapping relationship has been described by taking the transmission information as the DCI Format as an example. In the following, in connection with Table V to Table VIII, it will be described by taking the transmission information as DCI Size, DCI uplink and downlink information and resource type information as examples.

As shown in the first mapping relationship shown in Table V, it is assumed that the system bandwidth includes 8 BWPs, the first control information is DCI, and the transmission information is DCI Size. The first control information includes a preset bit, and the value of the bit is used to indicate the frequency band information of the target transmission frequency band in which the terminal device will perform the data transmission.

TABLE V

| DCI Size | BWP Serial Number | Frequency Band Information |
|---|---|---|
| DCI Size 1 | BWP 1 | 00 |
|  | BWP 2 | 01 |
|  | BWP 3 | 10 |
|  | BWP 4 | 11 |
| DCI Size 2 | BWP 5 | 0 |
|  | BWP 6 | 1 |
| DCI Size 3 | BWP 7 | Null |
| DCI Size 4 | BWP 8 | Null |

According to the mapping relationship shown in Table V, if the size of the DCI received by the terminal device is DCI Size 1, the terminal device can determine that at least one BWP corresponding to DCI Size 1 includes BWP 1 to BWP 4. If the frequency band information carried in the DCI received by the terminal device is 00, the terminal device can determine that the target transmission frequency band for the data transmission is BWP 1; if the frequency band information in the DCI is 01, the terminal device can determine the target transmission frequency band is BWP 2; if the frequency band information in the DCI is 10, the terminal device can determine that the target transmission frequency band is BWP 3; and if the frequency band information in the DCI is 11, the terminal device can determine that the target transmission frequency band is BWP 4.

If the size of the DCI received by the terminal device is DCI Size 2, the terminal device can determine that at least one BWP corresponding to the DCI Size 2 includes BWP 5 and BWP 6. If the frequency band information in the DCI is 0, the terminal device can determine that the target transmission frequency band is BWP 5; and if the frequency band information in the DCI is 1, the terminal device can determine that the target transmission frequency band is BWP 6.

If the size of the DCI received by the terminal device is DCI Size 3, the terminal device can determine that at least one BWP corresponding to the DCI Size 3 only includes BWP 7, and determine BWP 7 to be the target transmission frequency band.

If the size of the DCI received by the terminal device is DCI Size 4, the terminal device can determine that at least one BWP corresponding to the DCI Size 4 only includes BWP 8, and determine BWP 8 to be the target transmission frequency band.

It can be seen that if the DCI is directly used to indicate the eight transmission frequency bands of BWP 1 to BWP 8, respectively, at least 3 bits should be included in the DCI to indicate the respective transmission frequency bands. According to the mapping relationship shown in Table V, only two bits are required to indicate the eight transmission frequency bands of BWP 1 to BWP 8, which can reduce the signaling overhead of DCI. For example, if the size of the DCI received by the terminal device is DCI Size 2, the frequency band information carried in the DCI only occupies 1 bit, for example, 0 is used to indicate BWP 5, 1 is used to indicate BWP 6, and if the size of the DCI received by the terminal device is DCI Size 3, or DCI Size 4, the DCI may not carry any extra bit for indicating BWP, thereby saving DCI overhead.

For example, in the first mapping relationship shown in Table VI, it is assumed that the system bandwidth includes 8 BWPs, the first control information is DCI, and the transmission information is uplink and downlink information indicating whether the DCI is scheduling uplink data or downlink data. The first control information includes a preset bit, and the value of the bit is used to indicate the frequency band information of the target transmission frequency band in which the terminal device will perform the data transmission.

TABLE VI

| Uplink and Downlink Information | BWP Serial Number | Frequency Band Information |
| --- | --- | --- |
| Downlink Transmission | BWP 1 | 00 |
| | BWP 2 | 01 |
| | BWP 3 | 10 |
| | BWP 4 | 11 |
| Uplink Transmission | BWP 5 | 00 |
| | BWP 6 | 01 |
| | BWP 7 | 10 |
| | BWP 8 | 11 |

According to the mapping relationship shown in Table VI, if the DIC schedules downlink data, the terminal device can determine that at least one BWP corresponding to the downlink transmission includes BWP 1 to BWP 4. If the frequency band information carried in the DCI received by the terminal device is 00, the terminal device can determine that the target transmission frequency band for the data transmission is BWP 1; if the frequency band information in the DCI is 01, the terminal device can determine the target transmission frequency band is BWP 2; if the frequency band information in the DCI is 10, the terminal device can determine that the target transmission frequency band is BWP 3; and if the frequency band information in the DCI is 11, the terminal device can determine that the target transmission frequency band is BWP 4.

If the DCI schedules uplink data, the terminal device can determine that the at least one BWP corresponding to the uplink transmission includes BWP 5 to BWP 8. If the frequency band information carried in the DCI received by the terminal device is 00, the terminal device can determine that the target transmission frequency band for the data transmission is BWP 5; if the frequency band information in the DCI is 01, the terminal device can determine the target transmission frequency band is BWP 6; if the frequency band information in the DCI is 10, the terminal device can determine that the target transmission frequency band is BWP 7; and if the frequency band information in the DCI is 11, the terminal device can determine that the target transmission frequency band is BWP 8.

It can be seen that if the DCI is directly used to indicate the eight transmission frequency bands of BWP 1 to BWP 8, respectively, at least 3 bits should be included in the DCI to indicate the respective transmission frequency bands. According to the mapping relationship shown in Table VI, the network device only needs 2 bits to indicate the eight transmission frequency bands of BWP 1 to BWP 8, which can reduce the signaling overhead of DCI. For example, the DCI schedules downlink transmission, and the frequency band information carried in the DCI only occupies 2 bits. For example, 00 is used to indicate BWP 1, and 01 is used to indicate BWP 2.

Also, for example, in the first mapping relationship shown in Table VII, it is assumed that the system bandwidth includes 8 BWPs, and the transmission information is information indicating whether the first control information is used to schedule a common resource or a dedicated resource for the terminal device. The first control information includes a preset bit, and the value of the bit is used to indicate the frequency band information of the target transmission frequency band in which the terminal device will perform the data transmission.

TABLE VII

| Dedicated Resource or Common Resource | BWP Serial Number | Frequency Band Information |
| --- | --- | --- |
| Dedicated Resource | BWP 1 | 00 |
| | BWP 2 | 01 |
| | BWP 3 | 10 |
| | BWP 4 | 11 |
| Common Resource | BWP 5 | 00 |
| | BWP 6 | 01 |
| | BWP 7 | 10 |
| | BWP 8 | 11 |

According to the mapping relationship shown in Table VII, if the first control information schedules the dedicated resource for the terminal device, the terminal device can determine that the at least one BWP corresponding to the dedicated resource includes BWP 1 to BWP 4. If the frequency band information carried in the first control information received by the terminal device is 00, the terminal device can determine that the target transmission frequency band used for the data transmission is BWP 1; if the frequency band information in the first control information is 01, the terminal device can determine that the target transmission frequency band is BWP 2; if the frequency band information in the first control information is 10, the terminal device can determine that the target transmission frequency band is BWP 3; and if the frequency band information in the first control information is 11, the terminal device can determine that the target transmission frequency band is BWP 4.

If the first control information schedules a common resource of a plurality of terminal devices including the terminal device, the terminal device can determine that the at least one BWP corresponding to the common resource includes BWP 5 to BWP 8. If the frequency band information carried in the first control information received by the terminal device is 00, the terminal device can determine that the target transmission frequency band used for the data transmission is BWP 5; if the frequency band information in the first control information is 01, the terminal device can determine that the target transmission frequency band is BWP 6; if the frequency band information in the first control information is 10, the terminal device can determine that the target transmission frequency band is BWP 7; and if the frequency band information in the first control information is 11, the terminal device can determine that the target transmission frequency band is BWP 8.

It can be seen that if the first control information is used to directly indicate the eight transmission frequency bands of BWP 1 to BWP 8, at least 3 bits should be included in the first control information to indicate the respective transmission frequency bands. According to the mapping relationship shown in Table VII, the network device only needs 2 bits to indicate the eight transmission frequency bands of BWP 1 to BWP 8, which can reduce the signaling overhead of the first control information. For example, if the first control information schedules a dedicated resource, the frequency band information carried in the first control information can occupy only 2 bits, for example, 00 is used to indicate BWP 1, and 01 is used to indicate BWP 2.

For example, in the first mapping relationship shown in Table VIII, it is assumed that the system bandwidth includes 8 BWPs, and the transmission information indicates a resource scheduling unit. The first control information includes a preset bit, and the value of the bit is used to indicate the frequency band information of the target transmission frequency band in which the terminal device will perform the data transmission.

TABLE VIII

| resource scheduling unit | BWP Serial Number | Frequency Band Information |
| --- | --- | --- |
| Time Slot (slot-based scheduling) | BWP 1 | 00 |
| | BWP 2 | 01 |
| | BWP 3 | 10 |
| | BWP 4 | 11 |
| Symbol (symbol-based scheduling) | BWP 5 | 00 |
| | BWP 6 | 01 |
| | BWP 7 | 10 |
| | BWP 8 | 11 |

According to the mapping relationship shown in Table VIII, if the resource scheduling unit is a time slot, that is, the first control information is a slot-based scheduling of the network device, the terminal device can determine that at least one BWP corresponding to the resource scheduling unit being a time slot includes BWP 1 to BWP 4. If the frequency band information carried in the first control information received by the terminal device is 00, the terminal device can determine that the target transmission frequency band used for the data transmission is BWP 1; if the frequency band information in the first control information is 01, the terminal device can determine that the target transmission frequency band is BWP 2; if the frequency band information in the first control information is 10, the terminal device can determine that the target transmission frequency band is BWP 3; and if the frequency band information in the first control information is 11, the terminal device can determine that the target transmission frequency band is BWP 4.

If the resource scheduling unit is a symbol, that is, the first control information is a symbol-based scheduling of the network device, the terminal device can determine that the at least one BWP corresponding to the resource scheduling unit being a symbol includes BWP 5 to BWP 8. If the frequency band information carried in the first control information received by the terminal device is 00, the terminal device can determine that the target transmission frequency band used for the data transmission is BWP 5; if the frequency band information in the first control information is 01, the terminal device can determine that the target transmission frequency band is BWP 6; if the frequency band information in the first control information is 10, the terminal device can determine that the target transmission frequency band is BWP 7; and if the frequency band information in the first control information is 11, the terminal device can determine that the target transmission frequency band is BWP 8.

It can be seen that if the first control information is used to directly indicate the eight transmission frequency bands of BWP 1 to BWP 8, at least 3 bits should be included in the first control information to indicate the respective transmission frequency bands. According to the mapping relationship shown in Table VIII, the network device only needs 2 bits to indicate the eight transmission frequency bands of BWP 1 to BWP 8, which can reduce the signaling overhead of the first control information. For example, if the first control information is a slot-based scheduling, and the frequency band information carried in the first control information only occupies 2 bits, for example, 00 is used to indicate BWP 1, and 01 is used to indicate BWP 2.

Figure 3:
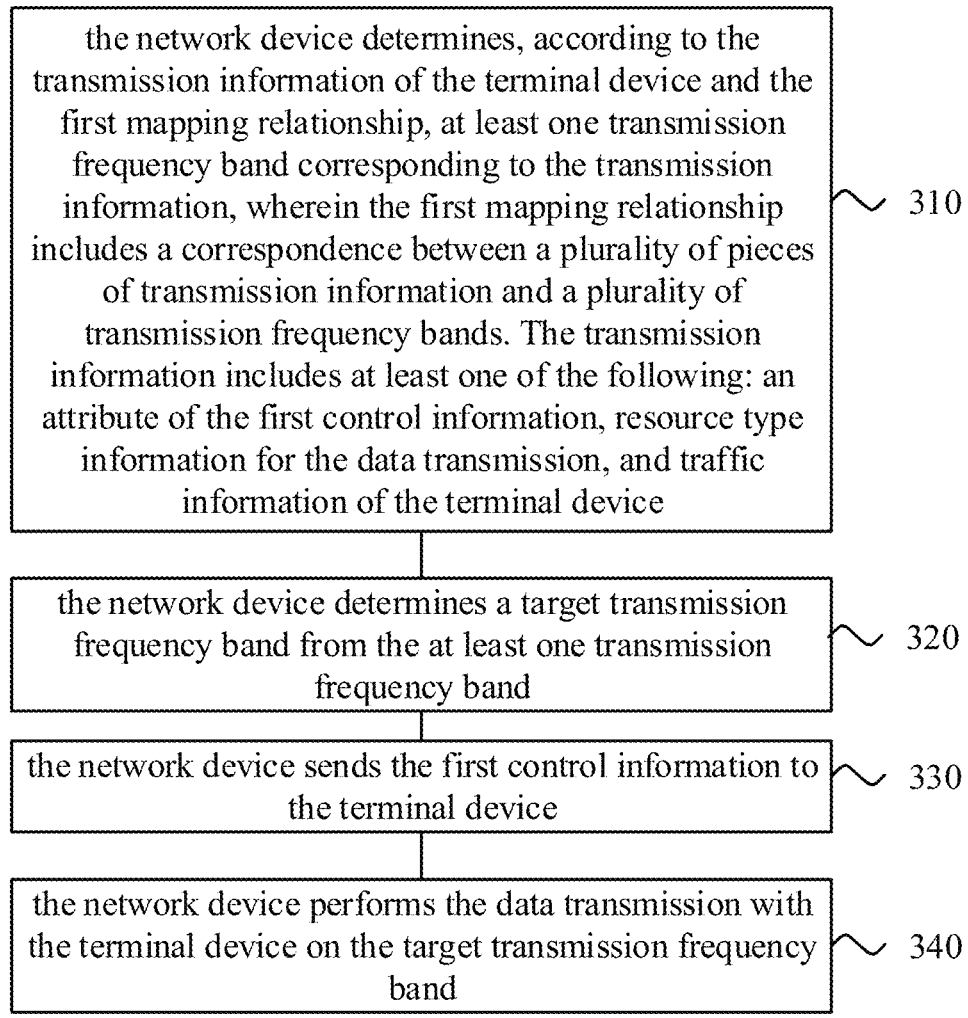
FIG. 3 is a schematic flowchart of a method for data transmission according to another embodiment of the present application.

FIG. 3 is a schematic flowchart of a method for data transmission according to an embodiment of the present application. The method illustrated in FIG. 3 can be performed by a network device, such as the network device 10 shown in FIG. 1. As shown in FIG. 3, the method for data transmission includes the following steps.

In 310, the network device determines, according to the transmission information of the terminal device and the first mapping relationship, at least one transmission frequency band corresponding to the transmission information, wherein the first mapping relationship includes a correspondence between a plurality of pieces of transmission information and a plurality of transmission frequency bands. The transmission information includes at least one of the following: an attribute of the first control information, resource type information for the data transmission, and traffic information of the terminal device.

In 320, the network device determines a target transmission frequency band from the at least one transmission frequency band.

In 330, the network device sends the first control information to the terminal device.

In 340, the network device performs the data transmission with the terminal device on the target transmission frequency band.

Specifically, the network device can determine, according to the transmission information of the terminal device and the first mapping relationship, at least one transmission frequency band corresponding to the transmission information (different transmission frequency bands can have different bandwidth sizes and/or occupy different frequency domain locations, among others, and different transmission frequency bands can also have different basic parameter sets, such as subcarrier intervals and the like), and in the at least one transmission frequency band, configure a target transmission frequency band for data transmission with the terminal device, thereby performing data transmission with the terminal device on the target transmission frequency band.

Accordingly, based on the method of the embodiment of the present application, the network device can determine, according to the transmission information of the terminal device, at least one transmission frequency band corresponding to the transmission information, and select, in the at least one transmission frequency band, a transmission frequency band for performing data transmission with the terminal device. Since the network device only has to indicate with respect to at least one transmission frequency band corresponding to each transmission frequency band without indicating with respect to all transmission frequency bands in the system bandwidth, it can reduce signaling overhead on downlink control information.

Optionally, the first control information includes frequency band information of the target transmission frequency band, and the first mapping relationship further includes a correspondence between a plurality of transmission frequency bands and a plurality of pieces of frequency band information. Before the network device sends the first control information to the terminal device, the method further includes: the network device, according to the target transmission frequency band and the first mapping relationship, determining the frequency band information corresponding to the target transmission frequency band from the at least one piece of frequency band information corresponding to the at least one transmission frequency band.

It should be noted that each transmission frequency band has its own corresponding frequency band information, and the frequency band information corresponding to each transmission frequency band is not unique. If the at least one transmission frequency band corresponding to the first transmission information includes the same transmission frequency band in the at least one transmission frequency band corresponding to the second transmission information, the same transmission frequency band can have different frequency band information or have the same frequency band information when corresponding to different transmission information.

After the network device determines the at least one transmission frequency band corresponding to the transmission information of the terminal device, according to the target transmission frequency band and the first mapping relationship, the network device should determine frequency band information corresponding to the target transmission frequency band from the at least one piece of frequency band information corresponding to the at least one transmission frequency band.

Optionally, before the network device performs the data transmission with the terminal device on the target transmission frequency band, the method further includes: the network device sending second control information to the terminal device, the second control information including the first mapping relationship.

Optionally, the first control information includes downlink control information DCI or a medium access control element MAC CE.

Optionally, the second control information includes a radio resource control RRC signaling or system information.

Optionally, the first control information is DCI, and the attribute of the first control information includes any one of the following: a DCI format of the DCI, a size of the DCI, and information indicating whether the DCI schedules uplink data or downlink data.

Optionally, the resource type information includes any one of the following information: information indicating that the first control information schedules a common resource or a dedicated resource for the terminal device, information indicating that the first control information schedules a continuous resource or discontinuous resources, or information indicating a resource scheduling unit, wherein the scheduling unit includes a symbol, a time slot or a subframe.

Optionally, the traffic information of the terminal device includes at least one of the following: traffic type information of the terminal device, service quality information of the terminal device, and traffic quality information of the terminal device.

Optionally, the plurality of pieces of transmission information includes first transmission information and second transmission information, and at least one transmission frequency band corresponding to the first transmission information and at least one transmission frequency band corresponding to the second transmission frequency band are the same or at least partially different.

It should be understood that the process of determining the transmission frequency band by the network device according to the first mapping relationship can refer to the above description of the terminal device in FIG. 2, and details are not described herein for brevity.

It should also be understood that, in various embodiments of the present application, the size of the sequence numbers of the above processes does not mean the order of execution, and the order of execution of each process should be determined by its function and internal logic, and should not be taken as limitation on the implementation of the embodiments of the present disclosure.

Figure 4:
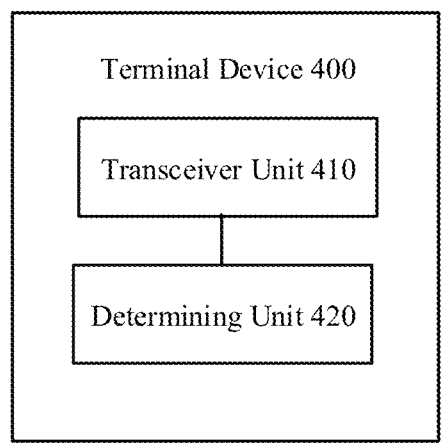
FIG. 4 is a schematic block diagram of a terminal device according to an embodiment of the present application.

FIG. 4 is a schematic block diagram of a terminal device 400 according to an embodiment of the present application. As shown in FIG. 4, the terminal device 400 includes a transceiver unit 410 and a determining unit 420.

The transceiver unit 410 is configured to receive first control information sent by the network device, wherein the first control information is used to schedule the terminal device to perform data transmission.

The determining unit 420 is configured to determine at least one transmission frequency band corresponding to transmission information according to the transmission information of the terminal device and a first mapping relationship, wherein the first mapping relationship includes a correspondence between a plurality of pieces of transmission information and a plurality of transmission frequency bands, and the transmission information includes at least one of the following: an attribute of the first control information, resource type information for the data transmission, and traffic information of the terminal device.

The determining unit 420 is further configured to determine a target transmission frequency band from the at least one transmission frequency band.

The transceiver unit 410 is further configured to perform the data transmission with the network device on the target transmission frequency band according to the first control information.

Therefore, the terminal device in the embodiment of the present application can determine at least one transmission frequency band corresponding to the transmission information according to the transmission information thereof, and determine a transmission frequency band for performing data transmission from the at least one transmission frequency band. Since the network device only has to indicate with respect to at least one transmission frequency band corresponding to each transmission frequency band without indicating with respect to all transmission frequency bands in the system bandwidth, it can reduce signaling overhead on downlink control information.

Optionally, the first control information includes frequency band information of the target transmission frequency band, and the first mapping relationship further includes a correspondence between a plurality of transmission frequency bands and a plurality of pieces of frequency band information. The determining unit 420 is specifically configured to, according to the frequency band information of the target transmission frequency band, and the first mapping relationship, determine the target transmission frequency band to be a transmission frequency band corresponding to the frequency band information from the at least one transmission frequency band.

Optionally, the transceiver unit 410 is further configured to receive second control information sent by the network device, wherein the second control information includes the first mapping relationship.

Optionally, the first control information includes downlink control information DCI or a medium access control element MAC CE.

Optionally, the second control information includes a radio resource control RRC signaling or system information.

Optionally, the first control information is DCI, and the attribute of the first control information includes any one of the following: a DCI format of the DCI, a size of the DCI, and information indicating whether the DCI schedules uplink data or downlink data.

Optionally, the resource type information includes any one of the following information: information indicating that the first control information schedules a common resource or a dedicated resource for the terminal device, information indicating that the first control information schedules a continuous resource or discontinuous resources, or information indicating a resource scheduling unit, wherein the scheduling unit includes a symbol, a time slot or a subframe.

Optionally, the traffic information of the terminal device includes at least one of the following: traffic type information of the terminal device, service quality information of the terminal device, and traffic quality information of the terminal device.

Optionally, the plurality of pieces of transmission information includes first transmission information and second transmission information, and at least one transmission frequency band corresponding to the first transmission information and at least one transmission frequency band corresponding to the second transmission information are the same or at least partially different.

Figure 5:
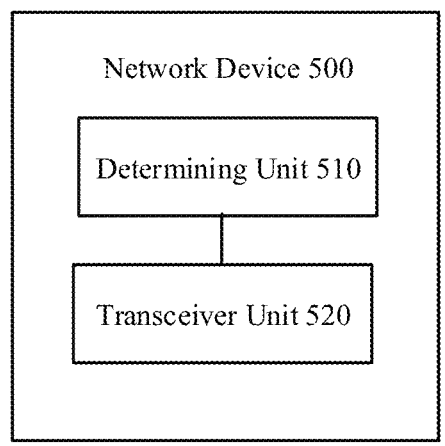
FIG. 5 is a schematic block diagram of a network device according to an embodiment of the present application.

FIG. 5 is a schematic block diagram of a network device 500 according to an embodiment of the present application. As shown in FIG. 5, the network device 500 includes a determining unit 510 and a transceiver unit 520.

The determining unit 510 is configured to determine, according to the transmission information of the terminal device and the first mapping relationship, at least one transmission frequency band corresponding to the transmission information, wherein the first mapping relationship includes a correspondence between a plurality of pieces of transmission information and a plurality of transmission frequency bands, and the transmission information includes at least one of the following: an attribute of the first control information, resource type information for the data transmission, and traffic information of the terminal device.

The determining unit 510 is further configured to determine a target transmission frequency band from the at least one transmission frequency band.

The transceiver unit 520 is configured to send the first control information to the terminal device.

The transceiver unit 520 is further configured to perform the data transmission with the terminal device on the target transmission frequency band.

Therefore, the network device in the embodiment of the present application can determine at least one transmission frequency band corresponding to the transmission information according to the transmission information of the terminal device, and select a transmission frequency band for performing data transmission with the terminal device from the at least one transmission frequency band. Since the network device only has to indicate with respect to at least one transmission frequency band corresponding to each transmission frequency band without indicating with respect to all transmission frequency bands in the system bandwidth, it can reduce signaling overhead on downlink control information.

Optionally, the first control information includes frequency band information of the target transmission frequency band, and the first mapping relationship further includes a correspondence between a plurality of transmission frequency bands and a plurality of pieces of frequency band information. The determining unit 510 is further configured to, according to the target transmission frequency band and the first mapping relationship, determine the frequency band information corresponding to the target transmission frequency band from the at least one piece of frequency band information corresponding to the at least one transmission frequency band.

Optionally, the transceiver unit 520 is further configured to send second control information to the terminal device, wherein the second control information includes the first mapping relationship.

Optionally, the first control information includes downlink control information DCI or a medium access control element MAC CE.

Optionally, the second control information includes a radio resource control RRC signaling or system information.

Optionally, the first control information is DCI, and the attribute of the first control information includes any one of the following: a DCI format of the DCI, a size of the DCI, and information indicating whether the DCI schedules uplink data or downlink data.

Optionally, the resource type information includes any one of the following information: information indicating that the first control information schedules a common resource or a dedicated resource for the terminal device, information indicating that the first control information schedules a continuous resource or discontinuous resources, or information indicating a resource scheduling unit, wherein the scheduling unit includes a symbol, a time slot or a subframe.

Optionally, the traffic information of the terminal device includes at least one of the following: traffic type information of the terminal device, service quality information of the terminal device, and traffic quality information of the terminal device.

Optionally, the plurality of pieces of transmission information includes first transmission information and second transmission information, and at least one transmission frequency band corresponding to the first transmission information and at least one transmission frequency band corresponding to the second transmission frequency band are the same or at least partially different.

Figure 6:
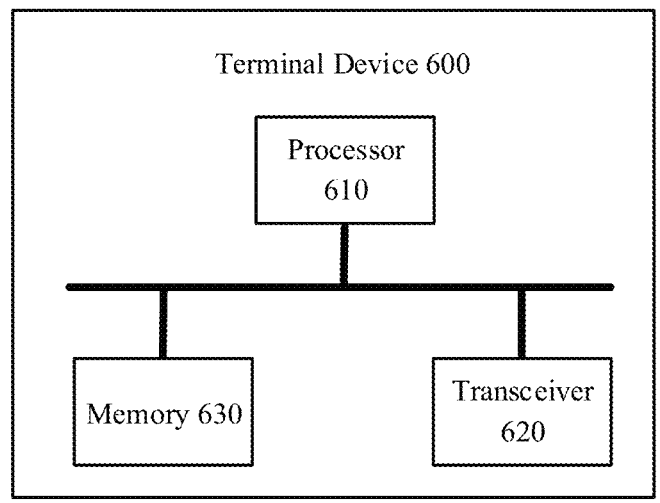
FIG. 6 is a schematic structural diagram of a terminal device according to an embodiment of the present application.

FIG. 6 is a schematic structural diagram of a terminal device 600 according to an embodiment of the present application. As shown in FIG. 6, the terminal device includes a processor 610, a transceiver 620, and a memory 630, wherein the processor 610, the transceiver 620, and the memory 630 communicate with one another via internal connection paths. The memory 630 is configured to store instructions for executing the instructions stored in the memory 630 to control the transceiver 620 to receive signals or transmit signals.

The transceiver 620 is configured to receive first control information sent by the network device, wherein the first control information is used to schedule the terminal device to perform data transmission.

The processor 610 is configured to determine at least one transmission frequency band corresponding to transmission information according to the transmission information of the terminal device and a first mapping relationship, wherein the first mapping relationship includes a correspondence between a plurality of pieces of transmission information and a plurality of transmission frequency bands, and the transmission information includes at least one of the following: an attribute of the first control information, resource type information for the data transmission, and traffic information of the terminal device; and determine a target transmission frequency band from the at least one transmission frequency band.

The transceiver 620 is further configured to perform the data transmission with the network device on the target transmission frequency band according to the first control information.

Optionally, the first control information includes frequency band information of the target transmission frequency band, and the first mapping relationship further includes a correspondence between a plurality of transmission frequency bands and a plurality of pieces of frequency band information. The processor 610 is specifically configured to, according to the frequency band information of the target transmission frequency band, and the first mapping relationship, determine the target transmission frequency band to be a transmission frequency band corresponding to the frequency band information from the at least one transmission frequency band.

Optionally, the transceiver 620 is further configured to receive second control information sent by the network device, wherein the second control information includes the first mapping relationship.

Optionally, the first control information includes downlink control information DCI or a medium access control element MAC CE.

Optionally, the second control information includes a radio resource control RRC signaling or system information.

Optionally, the first control information is DCI, and the attribute of the first control information includes any one of the following: a DCI format of the DCI, a size of the DCI, and information indicating whether the DCI schedules uplink data or downlink data.

Optionally, the resource type information includes any one of the following information: information indicating that the first control information schedules a common resource or a dedicated resource for the terminal device, information indicating that the first control information schedules a continuous resource or discontinuous resources, or information indicating a resource scheduling unit, wherein the scheduling unit includes a symbol, a time slot or a subframe.

Optionally, the traffic information of the terminal device includes at least one of the following: traffic type information of the terminal device, service quality information of the terminal device, and traffic quality information of the terminal device.

Optionally, the plurality of pieces of transmission information includes first transmission information and second transmission information, and at least one transmission frequency band corresponding to the first transmission information and at least one transmission frequency band corresponding to the second transmission frequency band are the same or at least partially different.

It should be understood that, in the embodiment of the present application, the processor 610 can be a central processing unit (CPU), and the processor 610 can also be other general-purpose processor, a digital signal processor (DSP), an application specific integrated circuit (ASIC), a field programmable gate array (FPGA) or other programmable logic device, a discrete gate or a transistor logic device, a discrete hardware component, and the like. The general purpose processor can be a microprocessor or the processor can be any conventional processor or the like.

The memory 630 can include a read only memory and a random access memory and provides instructions and data to the processor 610. A portion of the memory 630 can also include a non-volatile random access memory.

In the implementation process, each step of the above method can be completed by an integrated logic circuit of hardware in the processor 610 or an instruction in a form of software. The steps of the method disclosed in the embodiment of the present application can be directly implemented by the hardware processor, or can be performed by a combination of hardware and software modules in the processor 610. The software module can be located in a conventional storage medium such as a random access memory, a flash memory, a read only memory, a programmable read only memory or an electrically erasable programmable memory, a register, and the like. The storage medium is located in the memory 630, and the processor 610 reads information in the memory 630 and completes the steps of the above method in combination with its hardware. To avoid repetition, it will not be described in detail here.

The terminal device 600 according to the embodiment of the present application can correspond to the terminal device for performing the method 200 in the above method 200, and the terminal device 400 according to the embodiment of the present application, and each unit or module in the terminal device 600 is configured to perform operations or processes performed by the terminal device in the above method 200. Here, to avoid repetition, detailed description thereof will be omitted.

Figure 7:
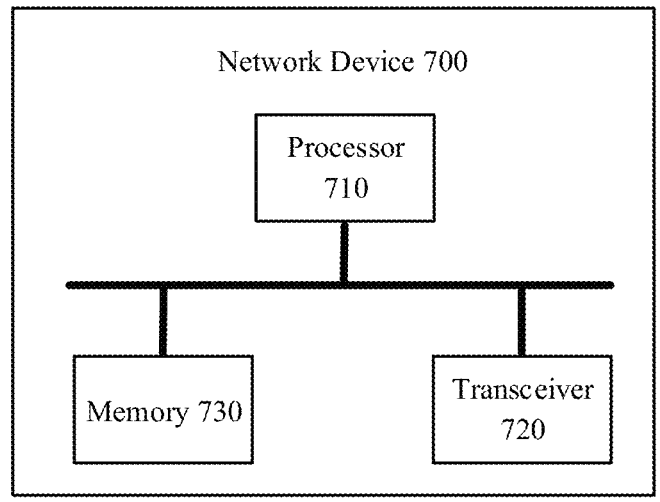
FIG. 7 is a schematic structural diagram of a network device according to an embodiment of the present application.

FIG. 7 is a schematic structural diagram of a network device 700 according to an embodiment of the present application. As shown in FIG. 7, the network device includes a processor 710, a transceiver 720, and a memory 730, wherein the processor 710, the transceiver 720, and the memory 730 communicate with one another via internal connection paths. The memory 730 is configured to store instructions for executing the instructions stored in the memory 730 to control the transceiver 720 to receive signals or transmit signals.

The processor 710 is configured to determine, according to the transmission information of the terminal device and the first mapping relationship, at least one transmission frequency band corresponding to the transmission information, wherein the first mapping relationship includes a correspondence between a plurality of pieces of transmission information and a plurality of transmission frequency bands, and the transmission information includes at least one of the following: an attribute of the first control information, resource type information for the data transmission, and traffic information of the terminal device; and determine a target transmission frequency band from the at least one transmission frequency band.

The transceiver 720 is configured to send the first control information to the terminal device; and perform the data transmission with the terminal device on the target transmission frequency band.

Optionally, the first control information includes frequency band information of the target transmission frequency band, and the first mapping relationship further includes a correspondence between a plurality of transmission frequency bands and a plurality of pieces of frequency band information. The processor 710 is further configured to, according to the target transmission frequency band and the first mapping relationship, determine the frequency band information corresponding to the target transmission frequency band from the at least one piece of frequency band information corresponding to the at least one transmission frequency band.

Optionally, the transceiver 720 is further configured to send second control information to the terminal device, wherein the second control information includes the first mapping relationship.

Optionally, the first control information includes downlink control information DCI or a medium access control element MAC CE.

Optionally, the second control information includes a radio resource control RRC signaling or system information.

Optionally, the first control information is DCI, and the attribute of the first control information includes any one of the following: a DCI format of the DCI, a size of the DCI, and information indicating whether the DCI schedules uplink data or downlink data.

Optionally, the resource type information includes any one of the following information: information indicating that the first control information schedules a common resource or a dedicated resource for the terminal device, information indicating that the first control information schedules a continuous resource or discontinuous resources, or information indicating a resource scheduling unit, wherein the scheduling unit includes a symbol, a time slot or a subframe.

Optionally, the traffic information of the terminal device includes at least one of the following: traffic type information of the terminal device, service quality information of the terminal device, and traffic quality information of the terminal device.

Optionally, the plurality of pieces of transmission information includes first transmission information and second transmission information, and at least one transmission frequency band corresponding to the first transmission information and at least one transmission frequency band corresponding to the second transmission frequency band are the same or at least partially different.

It should be understood that, in the embodiment of the present application, the processor 710 can be a central processing unit (CPU), and the processor 710 can also be other general-purpose processor, a digital signal processor (DSP), an application specific integrated circuit (ASIC), a field programmable gate array (FPGA) or other programmable logic device, a discrete gate or a transistor logic device, a discrete hardware component, and the like. The general purpose processor can be a microprocessor or the processor can be any conventional processor or the like.

The memory 730 can include a read only memory and a random access memory and provides instructions and data to the processor 710. A portion of the memory 730 can also include a non-volatile random access memory. In the implementation process, each step of the above method can be completed by an integrated logic circuit of hardware in the processor 710 or an instruction in a form of software. The steps of the method disclosed in the embodiment of the present application can be directly implemented by the hardware processor, or can be performed by a combination of hardware and software modules in the processor 710. The software module can be located in a conventional storage medium such as a random access memory, a flash memory, a read only memory, a programmable read only memory or an electrically erasable programmable memory, a register, and the like. The storage medium is located in memory 730, and processor 710 reads the information in memory 730 and completes the steps of the above method in combination with its hardware. To avoid repetition, it will not be described in detail here.

The network device 700 according to the embodiment of the present application can correspond to the network device for performing the method 300 in the above method 300, and the network device 500 according to the embodiment of the present application, and each unit or module in the network device 700 is configured to perform operations or processes performed by the network device in the above method 300. Here, to avoid repetition, detailed description thereof will be omitted.

Figure 8:
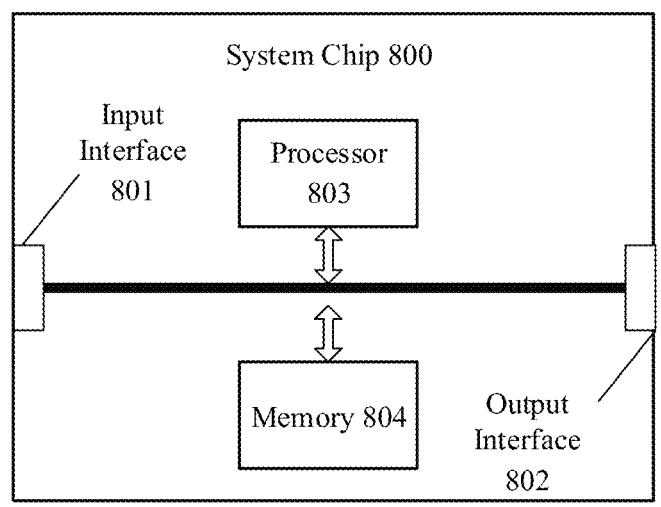
FIG. 8 is a schematic structural diagram of a system chip according to an embodiment of the present application.

FIG. 8 is a schematic structural diagram of a system chip according to an embodiment of the present application. The system chip 800 of FIG. 8 includes an input interface 801, an output interface 802, at least one processor 803, and a memory 804. The input interface 801, the output interface 802, the processor 803, and the memory 804 are interconnected by internal connection paths. The processor 803 is configured to execute codes in the memory 804.

Optionally, when the codes are executed, the processor 803 can implement the method 200 performed by the terminal device in the method embodiment. For the sake of brevity, it will not be repeated here.

Optionally, when the codes are executed, the processor 803 can implement the method 300 performed by the network device in the method embodiment. For the sake of brevity, it will not be repeated here.

Those of ordinary skill in the art will appreciate that the units and algorithm steps of the various examples described in connection with the embodiments disclosed herein can be implemented in electronic hardware or a combination of computer software and electronic hardware. Whether these functions are performed in hardware or software depends on the specific application and design constraints of the technical solution. A person skilled in the art can use different methods to implement the described functions for each particular application, but such implementation should not be considered to be beyond the scope of the present application.

A person skilled in the art can clearly understand that for the convenience and brevity of the description, the specific working process of the system, the device and the unit described above can refer to the corresponding process in the above method embodiment, and details are not described herein again.

In the several embodiments provided by the present application, it should be understood that the disclosed systems, devices, and methods can be implemented in other manners. For example, the device embodiments described above are merely illustrative. For example, the division of the unit is only a logical function division. In actual implementation, there can be another division manner, for example, multiple units or components can be combined or can be integrated into another system, or some features can be ignored or not executed. In addition, the mutual coupling or direct coupling or communication connection shown or discussed can be an indirect coupling or communication connection through some interfaces, devices or units, and can be in an electrical, mechanical or other form.

The units described as separate components can or cannot be physically separated, and the components displayed as units can or cannot be physical units, that is, can be located in one place, or can be distributed to a plurality of network units. Some or all of the units can be selected according to actual needs to achieve the purpose of the solution of the embodiment.

In addition, each functional unit in each embodiment of the present application can be integrated into one processing unit, or each unit can exist physically separately, or two or more units can be integrated into one unit.

The functions can be stored in a computer readable storage medium if implemented in the form of a software functional unit and sold or used as a standalone product. Based on such understanding, the technical solution of the present application, in its essential or with a part contributing to the prior art or a part of the technical solution, can be embodied in the form of a software product, which is stored in a storage medium, including instructions to cause a computer device (which can be a personal computer, a server, or a network device, etc.) to perform all or part of the steps of the methods described in various embodiments of the present application. The above storage medium includes: a U disk, a mobile hard disk, a read-only memory (ROM), a random access memory (RAM), a magnetic disk, or an optical disk, and the like, which can store program codes.

The above is only a specific embodiment of the present application, but the scope of protection of the present application is not limited thereto, and changes or substitutions that could be easily contemplated by any person skilled in the art within the technical scope disclosed in the present application should be covered by the scope of protection of this application. Therefore, the scope of protection of the present application should be determined by the scope of the claims.

What is claimed is:

1. A method for data transmission, comprising:
   determining, by a network device, according to a downlink control information (DCI) format of the DCI of a terminal device and a first mapping relationship, at least one band width part (BWP) corresponding to the DCI format of the DCI, wherein in the first mapping relationship, the DCI format of the DCI corresponds to one or more BWPs;
   determining, by the network device, a target BWP from the at least one BWP;
   sending, by the network device, the DCI to the terminal device; and
   performing, by the network device, the data transmission with the terminal device on the target BWP;
   wherein the DCI comprises frequency band information of the target BWP, and the first mapping relationship further comprises a correspondence between a plurality of BWPs and a plurality of pieces of frequency band information; and
   determining, by the network device, the target BWP from the at least one BWP, comprises:
   according to frequency band information of the target BWP, and the first mapping relationship, determining the target BWP to be a BWP corresponding to the frequency band information from the at least one BWP;
   wherein the DCI comprises preset bit(s) for indicating frequency band information of the BWP, and the preset bits comprise 0 bit, 1 bit, or 2 bits; and
   wherein the first mapping relationship comprises a correspondence between a plurality of DCI formats and a plurality of BWPs.

2. The method according to claim 1, wherein before the network device performs the data transmission with the terminal device on the target BWP, the method further comprises:
   sending, by the network device, second control information to the terminal device, wherein the second control information comprises the first mapping relationship.

3. The method according to claim 2, wherein the second control information comprises a radio resource control (RRC) signaling or system information.

4. The method according to claim 1, wherein the first mapping relationship is pre-agreed between the terminal device and the network device, or is determined by the network device and then configured to the terminal device.

5. A network device, comprising a processor, a transceiver, and a memory, wherein when the processor executes instructions stored by the memory, the execution causes the terminal network to:
   determine, by the processor, according to a downlink control information (DCI) format of the DCI of a terminal device and a first mapping relationship, at least one band width part (BWP) corresponding to the DCI format of the DCI wherein in the first mapping relationship, the DCI format of the DCI corresponds to one or more BWPs;
   wherein the processor is further configured to determine a target BWP from the at least one BWP;
   wherein the transceiver is configured to send the DCI to the terminal device; and
   wherein the transceiver is further configured to perform the data transmission with the terminal device on the target BWP;
   wherein the DCI comprises frequency band information of the target BWP, and the first mapping relationship further comprises a correspondence between a plurality of BWPs and a plurality of pieces of frequency band information; and
   wherein the processor is further configured to:
   according to frequency band information of the target BWP, and the first mapping relationship, determine the target BWP to be a BWP corresponding to the frequency band information from the at least one BWP;

wherein the DCI comprises preset bit(s) for indicating frequency band information of the BWP, and the preset bits comprise 0 bit, 1 bit, or 2 bits; and wherein the first mapping relationship comprises a correspondence between a plurality of DCI formats and a plurality of BWPs.

6. The network device according to claim 5, wherein the transceiver is further configured to:

send second control information to the terminal device, wherein the second control information comprises the first mapping relationship.

7. The network device according to claim 6, wherein the second control information comprises a radio resource control (RRC) signaling or system information.

8. The network device according to claim 5, wherein the first mapping relationship is pre-agreed between the terminal device and the network device, or is determined by the network device and then configured to the terminal device.

9. A terminal device, comprising:

a processor, a transceiver, and a memory, wherein when the processor executes instructions stored by the memory, the execution causes the terminal device to perform:

receiving, by the transceiver, downlink control information (DCI) sent by a network device, wherein the DCI is used to schedule the terminal device to perform data transmission; and determining, by the processor, according to a DCI format of the DCI of the terminal device and a first mapping relationship, at least one band width part (BWP) corresponding to the DCI format of the DCI, wherein in the first mapping relationship, the DCI format of the DCI corresponds to one or more BWPs;

processor is further configured to determine a target BWP from the at least one BWP; and wherein the transceiver is further configured to perform the data transmission with the network device on the target BWP according to the DCI;

wherein the DCI comprises frequency band information of the target BWP, and the first mapping relationship further comprises a correspondence between a plurality of BWPs and a plurality of pieces of frequency band information; and wherein the processor is further configured to:

according to the frequency band information of the target BWP, and the first mapping relationship, determine the target BWP to be a BWP corresponding to the frequency band information from the at least one BWP;

wherein the DCI comprises preset bit(s) for indicating frequency band information of the BWP, and the preset bits comprise 0 bit, 1 bit, or 2 bits; and wherein the first mapping relationship comprises a correspondence between a plurality of DCI formats and a plurality of BWPs.

10. The terminal device according to claim 9, wherein the first mapping relationship is pre-agreed between the terminal device and the network device, or is determined by the network device and then configured to the terminal device.

11. The terminal device according to claim 9, wherein the transceiver is further configured to:

receive second control information sent by the network device, the second control information comprising the first mapping relationship.

12. The terminal device according to claim 11, wherein the second control information comprises a radio resource control (RRC) signaling or system information.

* * * * *